United States Patent
Anderson et al.

(10) Patent No.: US 6,999,637 B1
(45) Date of Patent: Feb. 14, 2006

(54) METHOD AND SYSTEM FOR PROVIDING A PHOTO ALBUM TO A USER OF A DIGITAL IMAGING DEVICE

(75) Inventors: Eric C. Anderson, San Jose, CA (US); Stephen D. Saylor, Morgan Hill, CA (US)

(73) Assignee: IPAC Acquisition Subsidiary I, LLC, Peterborough, NH (US)

( * ) Notice: Subject to any disclaimer, the term of this patent is extended or adjusted under 35 U.S.C. 154(b) by 0 days.

(21) Appl. No.: 09/526,262

(22) Filed: Mar. 16, 2000

(51) Int. Cl.
G06K 9/03 (2006.01)

(52) U.S. Cl. .................................................. 382/311
(58) Field of Classification Search ................ 382/311; 348/64, 231.2, 231.4, 231.6; 358/506; 705/26; 707/202
See application file for complete search history.

(56) References Cited

U.S. PATENT DOCUMENTS

| | | | |
|---|---|---|---|
| 5,477,264 A * | 12/1995 | Sarbadhikari et al. ... | 348/231.6 |
| 5,561,458 A * | 10/1996 | Cronin et al. ................. | 348/64 |
| 5,940,121 A | 8/1999 | Mcintyre et al. ............ | 348/64 |
| 5,963,916 A * | 10/1999 | Kaplan ........................ | 705/26 |
| 6,324,545 B1 * | 11/2001 | Morag ......................... | 707/202 |
| 6,459,511 B1 * | 10/2002 | Haneda ....................... | 358/506 |

OTHER PUBLICATIONS

Kodak PhotoNet online print service: www.kodak.com/US/en/consumer/printService/eMemories.com: www.ememories.com/iPrint.com: www2.iprint.com/.

* cited by examiner

Primary Examiner—Vikkram Bali
(74) Attorney, Agent, or Firm—Sawyer Law Group LLP

(57) ABSTRACT

A method and system for providing a user with an album including a plurality of pages is disclosed. The method and system include allowing a user to purchase at least a portion of the album and allowing the user to set a plurality of defaults for the plurality of pages. The at least the portion of the album includes a portion of the plurality of pages. At least one default of the plurality of plurality of defaults is capable of being altered using information provided by the user. The method and system also include receiving from the user the information, if any, and receiving a plurality of images captured using a digital imaging device. The method and system also include altering the at least one default if the user has provided the information. The method and system also include providing a portion of the plurality of pages using the plurality of defaults and allowing the user access to the portion of the album.

38 Claims, 9 Drawing Sheets

METHOD AND SYSTEM FOR PROVIDING A PHOTO ALBUM TO A USER OF A DIGITAL IMAGING DEVICE

CROSS-REFERENCE TO RELATED APPLICATIONS

The present invention relates to co-pending U.S. patent application Ser. No. 09/514,230 entitled "AUTOMATICALLY STORING AND PRESENTING DIGITAL IMAGES USING A SPEECH-BASED COMMAND LANGUAGE" filed on Feb. 28, 2000 and assigned to the assignee of the present application.

FIELD OF THE INVENTION

The present invention relates to digital images, and more particularly to a method and system for providing a user of a digital imaging device a photo album of images captures.

BACKGROUND OF THE INVENTION

Digital photography has become increasingly prevalent. As users of digital imaging devices, such as digital cameras, continue to capture digital images, a means for archiving and viewing digital images becomes more important. Currently, conventional digital imaging devices can upload images to a computer system, such as a personal computer (PC). The user can then edit, view, and archive the images on the PC. The user can also organize the images into categories, for example using conventional software, such as PhotoSee Pro by ACD systems. If the image includes sound, some applications allow the user to hear the sound associated with the image using the sound system of the PC. In addition to archiving the image on the PC, a user can employ the PC to connect to a server via the Internet. The user can then archive the images on the server and print images, if desired.

The user can print the archived images from the PC or from the server. In addition to printing the image, techniques for allowing a user to hear sound associated with the image are also available. For example, a printed stripe can be provided along with the image. The printed stripe can be read using a device, such as a "ScanTalk" device manufactured by Olympus Optical Co., Ltd, of Japan. The ScanTalk device reads the printed stripe and plays the sound associated with the stripe. Thus, a user is able to view the image and hear the sound associated with the image.

A user often desires to organize printed images into photo albums for ease of viewing. Typically, this requires organizing the images after printing, mounting the individual images in the desired format on each album page and providing desired caption. Thus, a significant investment of time and effort is required from a user. This investment is particularly burdensome if a user has a large number of images desired to be placed in photo album or if the user wishes to categorize the images in the album in a particular fashion. For example, a user may wish to keep images of family members or certain events, such as vacations or children's sporting events, in separate photo albums or separate sections of a photo album. The user may also desire that images within a particular photo album be ordered in a certain way, for example in the order the images were captured or by subject. The user may also desire to have images of different sizes and orientations in the photo album, further complicating the organization of the images. Thus, in order to obtain a photo album containing the desired images, the user may be required to invest a significant amount of time and effort.

Conventional film cameras do have a method for facilitating production of photo albums. For example, U.S. Pat. No. 5,940,121 discloses a film camera that uses a film cartridge having a magnetic stripe. The user is allowed to indicate on the magnetic strip whether the user desires the corresponding film image to be part of an album, the general layout for pages within the photo album and a brief text annotation. When a user sends the film cartridge to a developer, the developer can print the selected images in the selected layout on pages having in an album-like format.

Although photo albums can be provided from the conventional film camera discussed above, there are still drawbacks to providing photo albums in this manner. Users of digital imaging devices cannot utilize the services of the developer to provide a photo album. Furthermore, the formats, captions, layouts and other aspects of the photo album pages may be limited. In addition, the user must make the selections on the magnetic strip of the film and is limited to the selected images on the film cartridge.

Accordingly, what is needed is an improved system and method for allowing a user to archive and view digital images. The present invention addresses such a need.

SUMMARY OF THE INVENTION

The present invention provides a method and system for providing a user with an album including a plurality of pages. The method and system comprise allowing a user to purchase at least a portion of the album. The portion of the album includes a portion of the plurality of pages. The method and system also comprise allowing the user to set a plurality of defaults for the plurality of pages. At least one of the defaults is capable of being altered using information provided by the user. The method and system also comprise receiving from the user the information, if any, and receiving a plurality of images captured using a digital imaging device. The method and system also comprise altering at least one of the defaults if the user has provided the information. The method and system also comprise providing a portion of the plurality of pages using the plurality of defaults and allowing the user access to the portion of the album.

According to the system and method disclosed herein, the present invention provides a means to easily and rapidly archive images in a customized fashion, particularly for providing a photo album or a web album.

DETAILED DESCRIPTION OF THE INVENTION

The present invention relates to an improvement in archiving of images which may be captured using a digital imaging device. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a user with an album including a plurality of pages. The method and system comprise allowing a user to purchase at least a portion of the album. The portion of the album includes a portion of the plurality of pages. The method and system also comprise allowing the user to set a plurality of defaults for the plurality of pages. At least one of the defaults is capable of being altered using information provided by the user. The method and system also comprise receiving from the user the information, if any, and receiving a plurality of images captured using a digital imaging device. The method and system also comprise altering at least one of the defaults if the user has provided the information. The method and system also comprise providing a portion of the plurality of pages using the plurality of defaults and allowing the user access to the portion of the album.

The present invention will be described in terms of a particular system and a particular method having certain steps. However, one of ordinary skill in the art will readily recognize that this method and system will operate effectively for other systems and other methods consistent with the present invention. Furthermore, the present invention is described in the context of images captured using a digital imaging device. However, one of ordinary skill in the art will realize that the present invention will operate effectively for digital images which were not originally captured using a digital imaging device.

Figure 1:
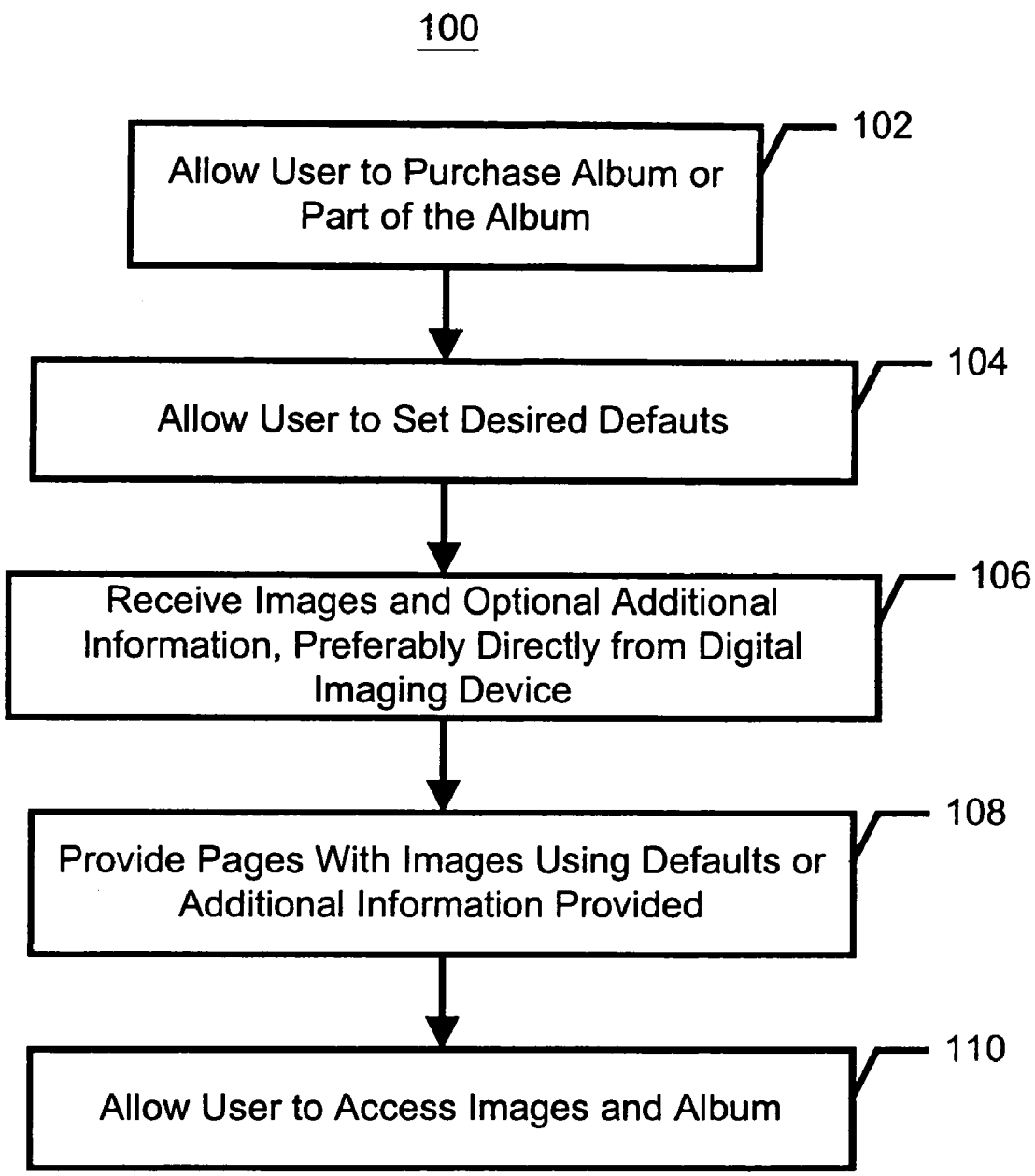
FIG. 1 is a high-level flow chart depicting one embodiment of a method for allowing a user to purchase an album in accordance with the present invention.

To more particularly illustrate the method and system in accordance with the present invention, refer now to FIG. 1, depicting one embodiment of a method for providing a user with an album in accordance with the present invention. A user is allowed to purchase an album, or a portion of an album, via step 102. Preferably, step 102 is performed prior to the user capturing images or providing captured images for placement in the album. For example, when a user purchases a digital imaging device, the user may be given a phone number or website to contact. The user can then inform the server, individual or other representative of the provider of the album of the user's desire to purchase an album. Preferably, the server also provides a credit card number or other account to pay for at least a part of the album. In another embodiment, some other form of payment, particularly prepayment, may be arranged. In one embodiment, however, the album or a portion of the album may be free, which allows the user to "purchase" the free portion album merely by requesting the album. In another embodiment, a user could purchase the album merely by purchasing storage for the album, for example when the album is a web album. The album or portion of the album purchased in step 102 could be a printed photo album, a web album that the user accesses via a website, a CD-ROM or some combination thereof.

The user is then allowed to select defaults for the album, via step 104. The defaults are preferably set once for the entire album. Thus, once the user has set the defaults, the album will automatically be configured using the defaults. Thus, the user need not set the same default for each page or each image. For example, if in step 104 the user sets as a default to have each page in the album contain four images, then the pages will be provided using this default. In one embodiment, the user need not be able to set all defaults which are available for the album. In such an embodiment, the use would be capable of setting some portion of the defaults. The remaining portion of the defaults would preferably be automatically used.

Preferably, step 104 includes allowing the to user enter the selections for the defaults directly onto a server via a website. However, step 104 could include receiving information relating to the defaults via a phone call or other mechanism, and providing the information to a server or other system which archives the defaults. For example, when purchasing a digital imaging device, the user could be provided with a booklet including some of the defaults. The defaults could include a variety of aspects of the album. For example, the defaults possible to select could include a background color or image and style for pages within the album, whether the page numbers should be printed on the album, a default way of categorizing images, whether the maker of the album has flexibility in honoring the defaults, whether the user wishes the images to undergo further analysis and image processing to improve image quality, whether to print certain selected camera settings with the image and whether to print a table of contents for an album. As a result, the user could simply and quickly pre-format the album as well as the images within the album.

Images are received, via step 106. In a preferred embodiment, the images are received by a server directly from a digital imaging device such as a digital camera. However, it is possible to receive the image from another mechanism, such as a PC. In addition, in an alternate embodiment, the user could provide printed images which are to be scanned in. Also in a preferred embodiment, additional information may be received in step 106. The optional additional information indicates whether some or all of the defaults should be overridden for one or more of the images. For example, the user may have selected as a default not to have additional image processing performed on the images. However, a user may desire to have additional image processing performed on a particular image or images. The additional information would indicate that the default relating to image processing is to be overridden for these images and image processing provided for these images. Similarly, a user may have set a default indicating that the provider of the album could not deviate from a set default layout, such as four images per page. A user may wish to have a particular image occupy an entire page. Thus, for this image, this particular default would be overridden, allowing the desired image to substantially fill a page. In one embodiment, an images file stores the additional information relating to that image. Thus, the user would have previously indicated whether certain defaults should be overridden for particular images and this information stored in the files for the particular images. Also in a preferred embodiment, the additional information is stored in the tags of the image file for the corresponding image. Thus, the additional information is automatically received when the image file is received. However, in an alternate embodiment, the user can provide this information separately from the images. In such a case, the additional information should also indicate to which images the information applies. Furthermore, more images than are desired to be placed in the album could be received. In this case, the additional information would include an indication of which images are desired to be placed in the album. The additional information could also include data, such as sound, caption or category information. However, in a preferred embodiment, this type of data is provided along with the image.

The pages including the images are then provided using the defaults, some of which may have been altered by the additional information, via step 108. Thus, step 108 can include screening unwanted images, if any, as well as performing any image processing and layout for the album. In addition, step 108 includes providing any other processing which may be required to provide the pages and images. For example, images captured by digital imaging devices may include sound. Step 108 could then include processing the sound and ensuring that some mechanism for allowing the user to hear the sound is available. If the image is to be part of a printed photo album, then step 108 could include converting the sound to a format to be printed on the corresponding page of the photo album. When the page is printed, then a stripe could be printed onto the page and read with a ScanTalk or other device which converts a printed stripe to sound. Alternatively, step 108 could include converting the sound to a format to be downloaded to a semiconductor device or other device to be embedded in the page of the photo album, allowing the user to hear the sound when the semiconductor device is activated. Similarly, if the images are to be categorized, step 108 would include determining the categories of the images to be categorized, saving the categorization information in the appropriate format and organizing the images based on their category. Furthermore, if the categories are provided using speech, step 108 would include analyzing the speech indicating the categories, determining the categories based on the analyzed speech, converting the category information to text and saving the text category information, preferably as a tag in the image file. One such mechanism for categorizing images is described in co-pending U.S. patent application Ser. No. 095/4230 (P192/1586P) entitled "AUTOMATICALLY STORING AND PRESENTING DIGITAL IMAGES USING A SPEECH-BASED COMMAND LANGUAGE" filed on Feb. 28, 2000 and assigned to the assignee of the present application. Applicants hereby incorporate by reference the above-mentioned co-pending patent application. In addition, if there are multiple images in the category, step 108 could include organizing images by sub-category, based on when the image was captured, or some mechanism that may be selected by the user. Similarly, the user could provide captions for one or more of the images. Preferably, the information relating to a caption is provided in the file for the corresponding image. However, the captions can be provided separately from the image. Moreover, in one embodiment, the caption may be provided via speech recorded by the user. For example, a user could record a caption in a caption field using ability of a digital imaging device to record sound. Step 108 could then include analyzing the speech in the caption field, converting the speech to a text caption for the image and saving the text caption, preferably in a tag in the image. In an alternate embodiment, the user could input a text caption either through the use of the interface for the digital imaging device or directly to the server. Thus, step 108 includes providing processing required for the images and the pages in which the images will be placed.

The user is then allowed access to the images, via step 110. In one embodiment, where a printed photo album is to be provided to the user, step 110 includes printing the pages and sending the pages to the user, for example through the mail. For a printed photo album, step 110 would also include providing the user with some mechanism for hearing any associated sound. For example, if the sound was provided as a printed stripe, then step 110 may include providing a device to read and play the printed stripe. Similarly, if sound was provided on a semiconductor device, then step 110 would include providing the semiconductor device with the pages, preferably embedded in the corresponding page as well as providing the user with a device, such as an amplifier, speakers and a power source, for the user to hear the sound. When the album is a web album, step 110 could include allowing a user to access the web album on the appropriate website. In yet another embodiment, the album could be downloaded to another medium, such as a CD-ROM. Step 110 may then include providing the CD-ROM containing the album to the user. Similarly, step 110 could include downloading the album to the user's PC. Thus, the user is provided with an album that is customized according to the user's preferences, as expressed in the defaults and additional information, while requiring little effort from the user.

Figure 2:
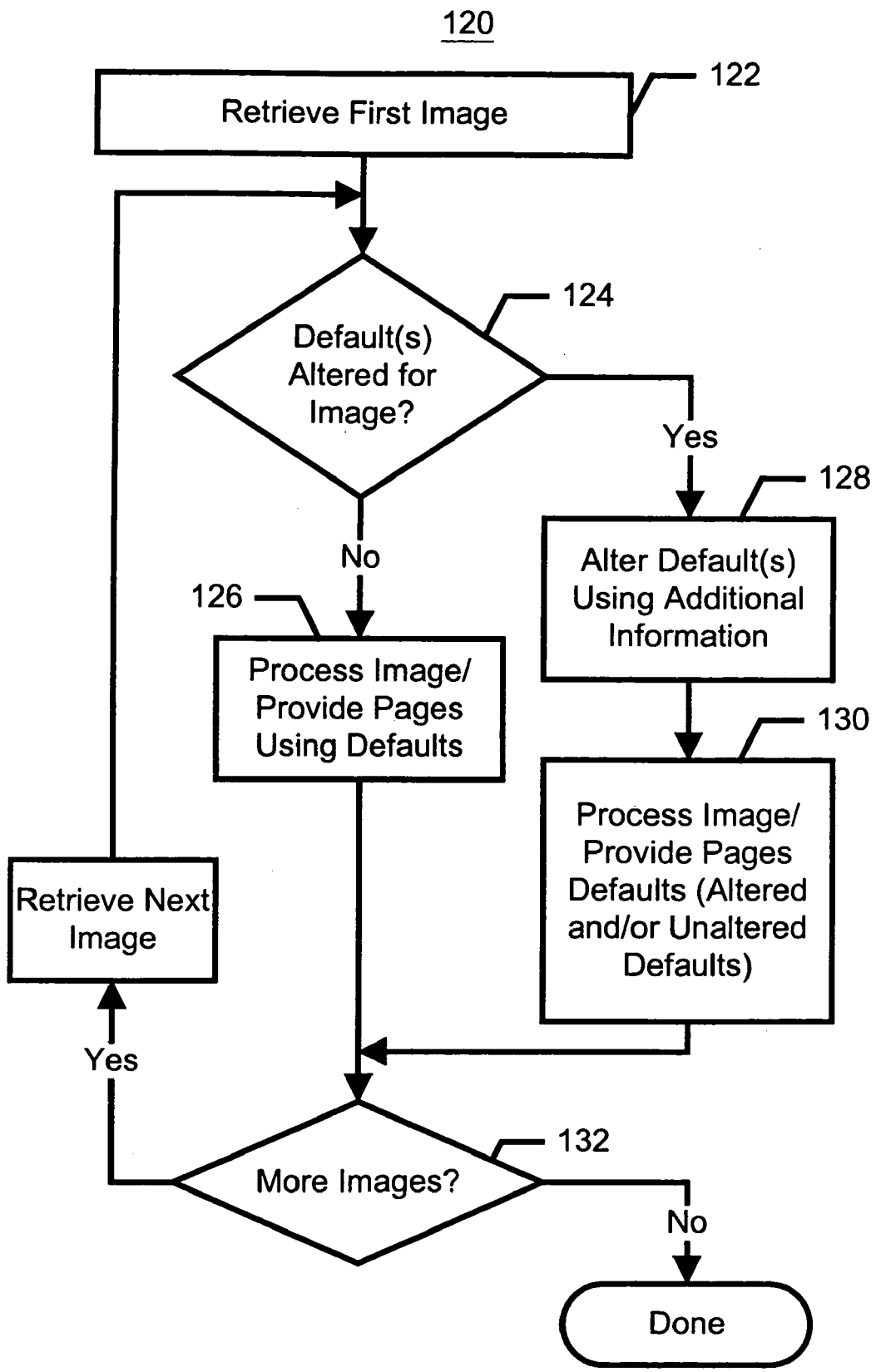
FIG. 2 is a more detailed flow chart of one embodiment of a method for utilizing defaults in accordance with the present invention.

FIG. 2 depicts a flow chart of one embodiment of a method 120 for determining how images are to be provided in accordance with the present invention. Thus, the method 120 may be used in performing a portion of the step 108 of the method 100 depicted in FIG. 1. Referring back to FIG. 2, an image is received, via step 122. It is then determined whether the defaults have been altered for that image, via step 124. In one embodiment, step 124 is performed by reading the image file and determining if the image file includes tags containing additional information that alters one or more of the selected defaults. If it is determined that none of the defaults is to be altered, then the image is processed and the pages provided using the selected defaults, via step 126. If, however, it is determined that one or more of the defaults is to be altered, then the additional information provided is used to alter these defaults for that image, via step 128. The image is processed and the pages provided using the defaults, one or more of which may have been altered, via step 130. In a preferred embodiment steps 126 and 130 include performing any image processing, voice analysis, and conversion of speech to text as well as setting the desired position of the image in the album. After the image is processed using step 126 or 130, it is determined if there are more images to be processed, via step 132. If so, then another image is retrieved for processing, via step 134, and step 124 is returned to. However, if no images remain to be processed, then the method 120 terminates.

Thus, using the method 120, the image can be processed as desired. Thus, the pages of the album can be provided as desired by the user.

Figure 3A:
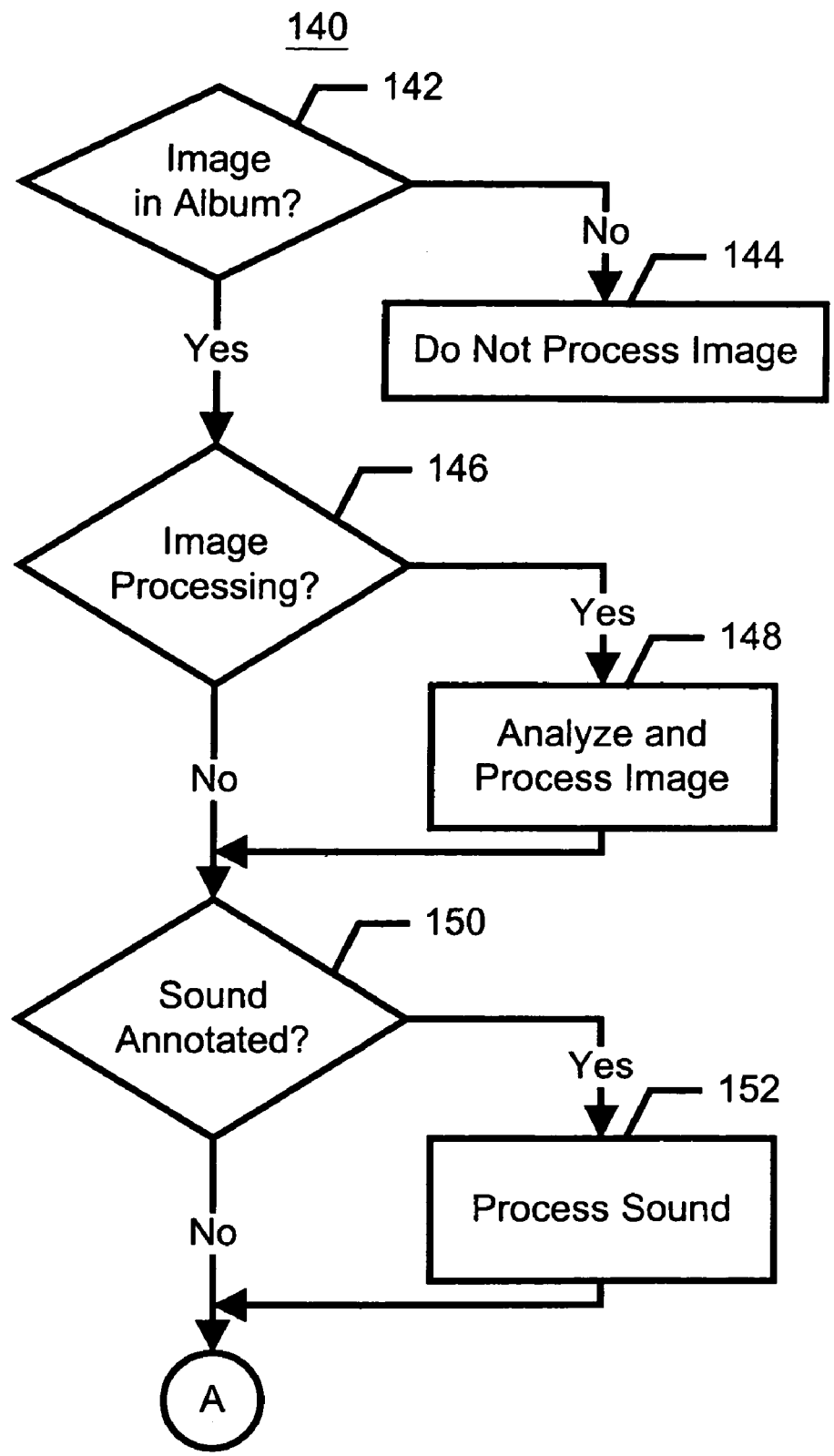
FIGS. 3A and 3B depict a more detailed flow chart of one embodiment of a method for providing images in accordance with the present invention.
Figure 3B:
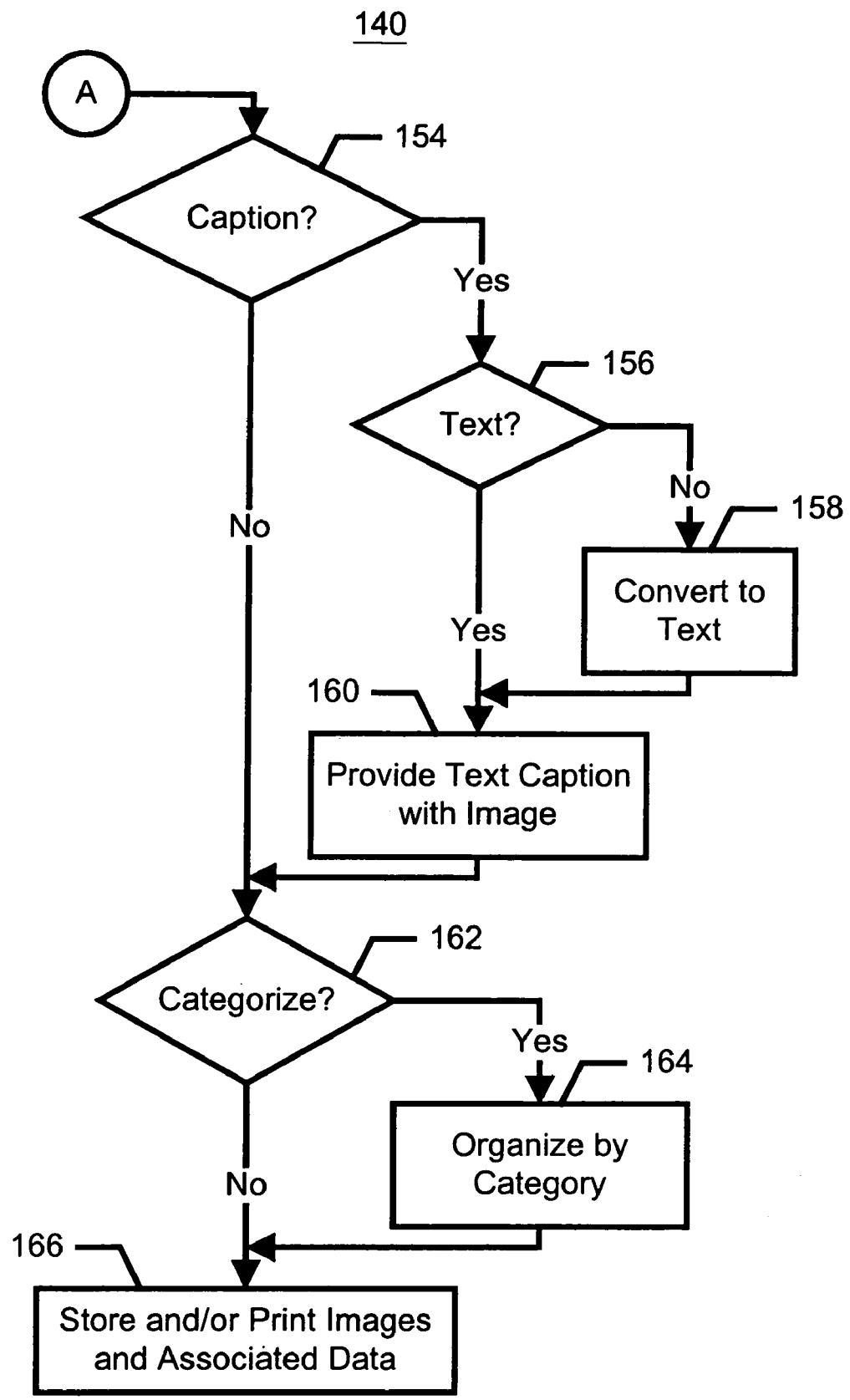

FIGS. 3A and 3B depict a more detailed flow chart of one embodiment a method 140 for providing the pages in accordance with the present invention. Thus, the method 140 can be utilized in the step 108 of the method 100 depicted in FIG. 1. Referring back to FIGS. 3A and 3B, it is determined whether an image is to be included in the album, via step 142. If not, then the image may be discarded, via step 144. In an alternate embodiment, the image that is not to be included in the album may go through more of the steps of the method 140, but simply not included in the album. If it is determined that the image is to be part of the album, then it is determined in whether the image should undergo additional image processing, via step 146. Step 146 could include determining whether the defaults or additional information indicate that the image should undergo image processing. If additional processing is called for, then the image may be analyzed and processed, via step 148. Thus, image quality may be enhanced. If not additional processing is desired, then step 148 is skipped.

It is determined whether the image has been annotated with sound desired to be played when an individual views the image, via step 150. Preferably, step 150 includes determining whether sound has been stored in the image file and determining whether the user has chosen to hear the sound in the album. However, step 150 could include accessing other information relating to the image. If the image does include sound, then the sound may be processed, via step 152. For example, if the image is to be printed, then step 152 may include converting the sound data to a format that can be printed onto the corresponding page and read using a ScanTalk or other device. Similarly, step 152 could include providing the sound in a format that is downloadable to a semiconductor device to be embedded in the corresponding page. For a web album or CD-ROM, step 152 could include ensuring that the sound is in a format which can be accessed by the user via the website or software for playing the CD-ROM. If, however, the image is not annotated with sound, then step 152 is skipped.

It is determined whether the image has a corresponding caption, via step 154. Preferably step 154 is performed by determining whether a text or voice caption field in the image file includes a caption. However, step 154 could include accessing other information relating to the image. If the image has a caption, then it is determined whether the caption is in text, via step 156. If the caption is not already in a text format, then the caption is converted to text, via step 158. If the caption was voice recorded, then step 158 could include applying voice recognition software to the recorded caption and translating the recorded caption into text. If the caption was already in a text format, then step 158 may be skipped. The text caption is provided with the image, either after conversion or from the caption stored as text, via step 160. Preferably, step 160 includes storing the caption, as translated from speech to text, in a tag for the image. Step 160 may also include removing the speech caption in order to reduce the size of the image file.

It is determined whether the image has a corresponding category or categories, via step 162. Preferably step 162 includes determining the category from the image file. However, step 162 could include accessing other information relating to the image. In addition, if the category is provided via speech, step 162 could include applying voice recognition software to the recorded category. If the image includes one or more categories, then the image is placed within the appropriate category or categories, via step 164. Step 164 also preferably includes ordering the images in the category, for example by time, subject, subcategory, or combination thereof. Preferably, step 164 also includes storing the category, as translated from speech to text, in a tag for the image. Step 164 may also include removing the speech category in order to reduce the size of the image file.

The image and any corresponding information, such as sound or captions, may then be archived and/or printed, via step 166: For a printed album, step 166 may include temporarily archiving the image, then printing the image on the appropriate page using the defaults and any additional information. In such a case, step 166 may also include printing a caption and any printed stripe for sound or providing another mechanism for hearing sound associated with the image. A device for playing the sound may also be provided for the user. Step 166 would also include printing the image on the page using the desired layout and other page characteristics specified by the user. For a web album, step 166 may include archiving the image so that the image can be viewed from a website in the desired format. Also for a web album, step 166 would include archiving the sound corresponding to the image so that a user may play the sound when viewing the image. For a CD-ROM, step 166 may include archiving the image, any associated sound and caption and other information corresponding to the image in a manner that facilitates transfer to a CD-ROM. Thus, the image can be provided in an album having the desired format at minimum effort for the user. The method 140 can also be repeated for each image received from the user.

Figure 4:
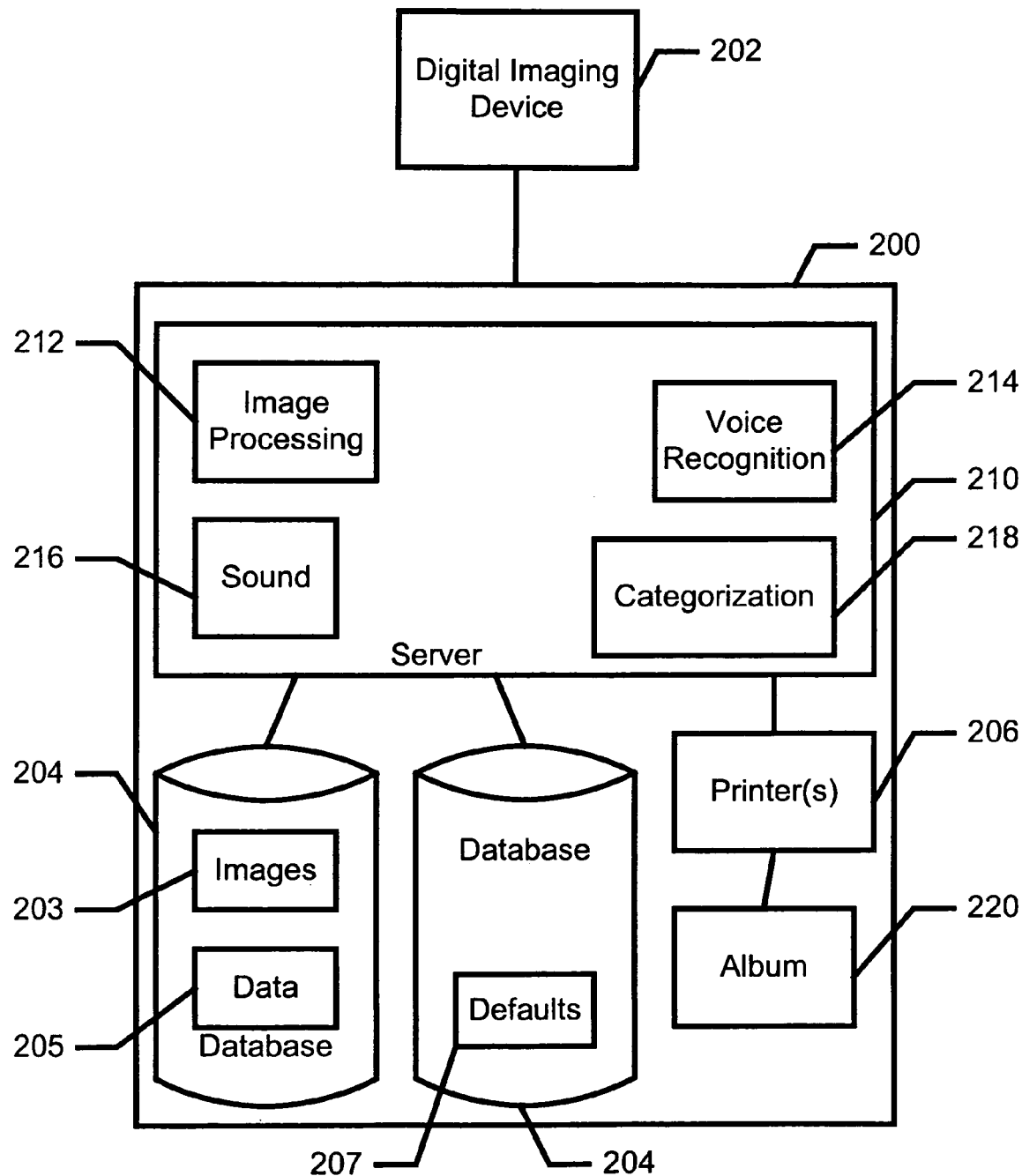
FIG. 4 is a high-level block diagram of one embodiment of a system for allowing a user to purchase an album in accordance with the present invention.

FIG. 4 depicts one embodiment of a system 200 in accordance with the present invention for providing a user with an album. Also depicted is a digital imaging device 202 coupled with the system 200. The system 200 is preferably a website which the user can connect to via the Internet using the digital imaging device 202 or a PC. The system 200 includes a server 210. The server can include imaging processing software 212, voice recognition software 214, sound software 216 and categorization software 218. In addition, the server 210 may include software for interfacing with the digital imaging device 202 or with another computer system (not shown) as well as other software. Thus, the server 210 preferably performs most of the steps for the methods 100, 120 and 140. The server 210 therefore, preferably controls most user interactions, receiving and processing of images, printing of pages for the album and a website through which the user can view a web album. However, in an alternate embodiment, multiple servers and multiple websites could be used for different aspects of the present invention. For example, one website, structured similarly to the system 200, could control the interaction with the users for purchasing the album and selecting defaults for the album. This information would be shared with another website, also structured similarly to the system 200, which receives images and controls providing the album.

Coupled to the server 210 are databases 204 and 208. The database 204 may be used to archive images and associated sound, text, defaults, and other information selected by the user. Thus, the database 204 is depicted as included images 203 and user-provided data 205. The database 208 may be used for archiving the defaults 207 and other information which the user can select from. For example, the database 208 may include different page backgrounds and formats, different page colors and other information. Also coupled to the server is one or more printer(s) 206. The printer(s) 206 are used for printing the pages for a photo album. Thus, the printer(s) 206 are preferably capable of printing color images, text, stripes to be used to read sound or other aspects of the pages for the photo album that are to be printed. A mechanism 209 for writing to a CD-ROM is also coupled to the server 210. The mechanism 209 allows the system 200 to provide a CD-ROM including images, the images and sound, or the entire album to the user. In addition, in one embodiment, the system 200 can download the album to the user's computer (not shown).

Also depicted in FIG. 4 is a printed photo album 220, which includes pages printed by the printer, a cover, and any mechanism used for allowing a user to hear sound. For example, the photo album preferably includes either a device for playing the printed sound, such as a ScanTalk device or a semiconductor device including the sound. Thus, the system 200 is capable of providing a user with an album, such as a printed photo album, a web album or both. The system 200 can also provide a CD-ROM.

Figure 5A:
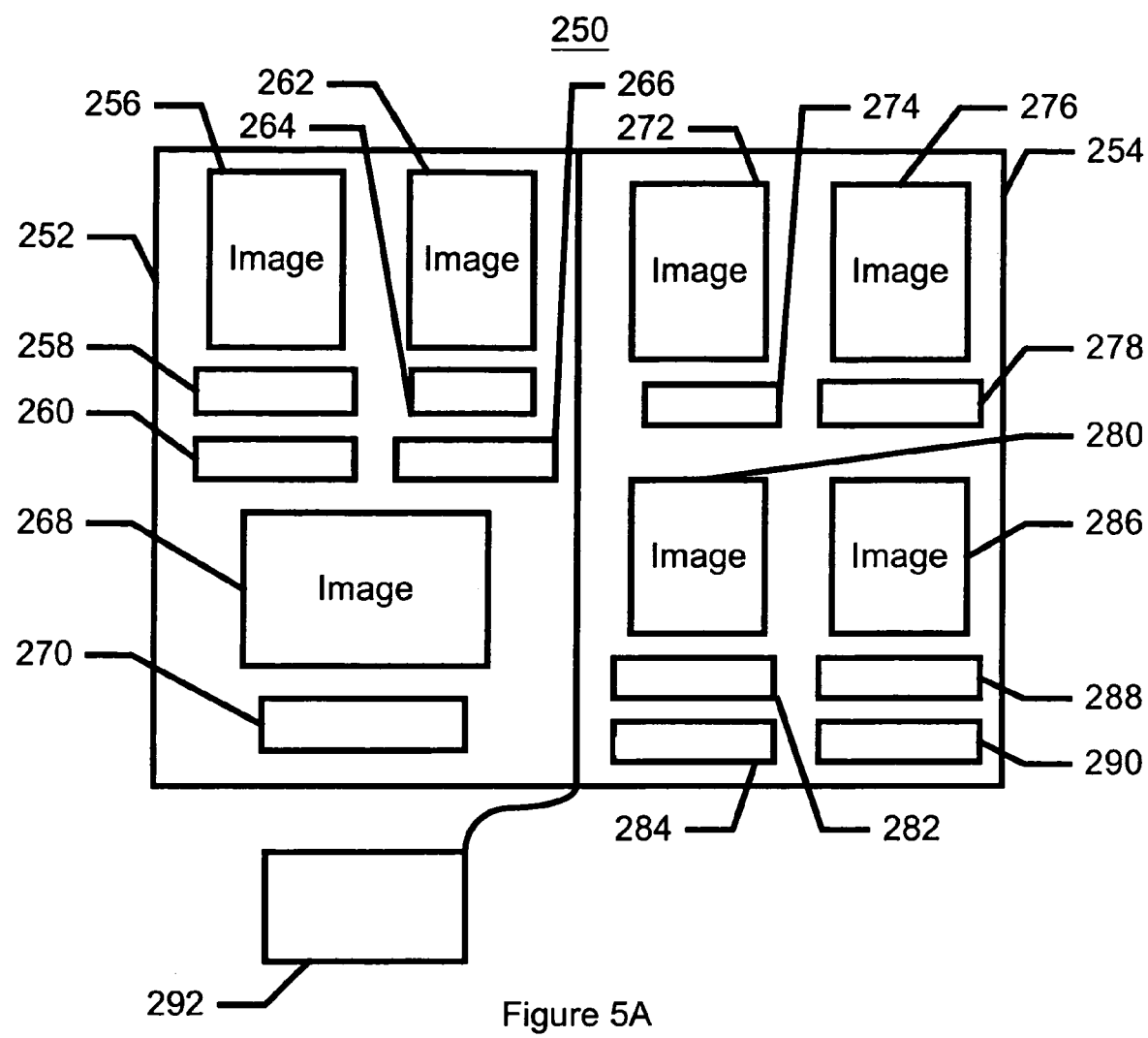
FIG. 5A is a diagram of one embodiment of a pair of pages of an album in accordance with the present invention.
Figure 5B:
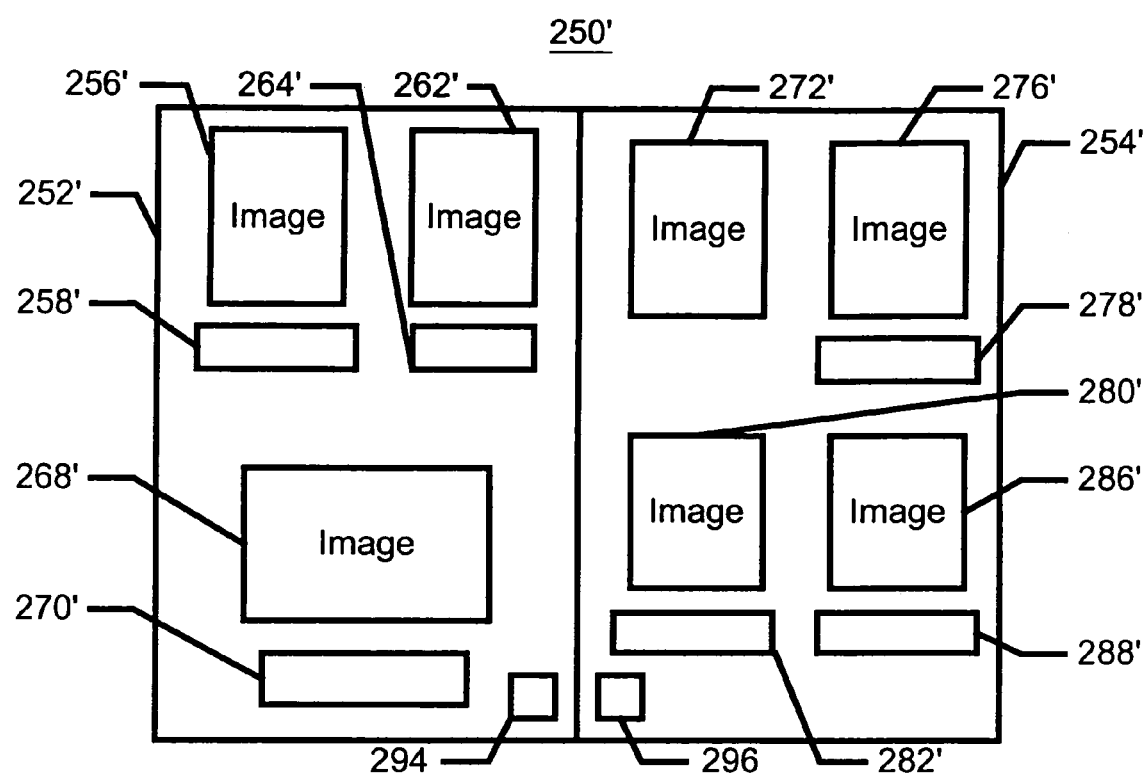
FIG. 5B is a diagram of another embodiment of a pair of pages of an album in accordance with the present invention.

FIGS. 5A–5B depict two embodiments of pages in printed photo albums. FIG. 5A depicts pages 252 and 254 for the printed photo album 250. The pages 252 and 254 have different layouts. In particular, page 252 includes images 256, 262 and 268, while page 254 includes images 272, 276, 282 and 286. Thus, a default layout for the page 252, the page 254, or both may have been overridden or altered slightly to accommodate the images 256, 262, 268, 272, 276, 282 and 286. Also depicted are captions 258, 264, 270, 278, 282 and 288 for images 256, 262, 268, 276, 282 and 286, respectively. In addition, FIG. 5A depicts printed stripes 260, 266, 274, 284 and 290 for images 256, 262, 272, 280 and 286, respectively. The printed stripes 260, 266, 274 and 290 are for allowing a user to hear the sound associated with the images 256, 262, 272, 280 and 286, respectively. Also provided with the album 250 is a device 242 for reading and playing the sound from the printed stripes 260, 266, 274 and 290.

FIG. 5B depicts another embodiment of pages 252' and 254' for a printed photo album 250'. The album 250' includes images 256', 262', 268', 272', 276', 280' and 286'. Captions 258', 264', 270', 276', 282' and 290' for images 256', 262', 268', 276', 280' and 286', respectively. Also included are semiconductor devices 294 and 296 for pages 252' and 254', respectively. The semiconductor device 294 provides sound associated with images on the page 252', while the semiconductor device 296 provides sound associated with images on page 254'. The semiconductor devices 294 and 296 may be activated by the user, for example by the user pressing on the semiconductor device 294 and 296. In another embodiment, the semiconductor device 294 and 296 may be automatically activated, for example when the user turns to the corresponding page. A speaker, amplifier and power source, such as batteries, may also be included with the album or with an external device to allow the user to hear the sound stored on the semiconductor devices 294 and 296 when the semiconductor devices 294 and 296 are activated.

Figure 6A:
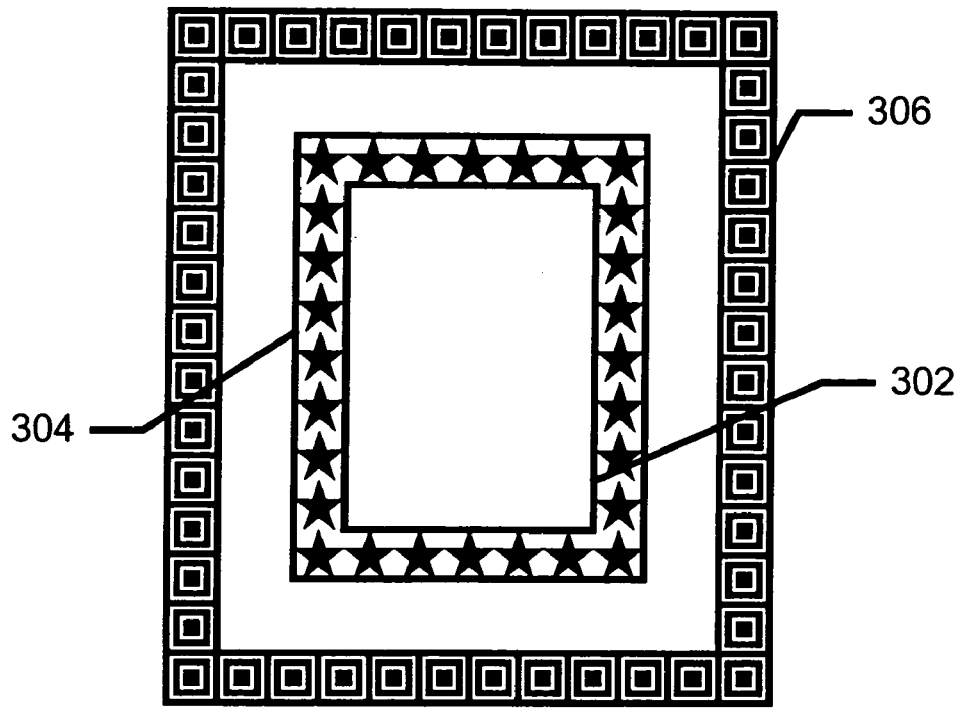
FIG. 6A is a diagram of one embodiment of a background for a page of an album in accordance with the present invention.
Figure 6B:
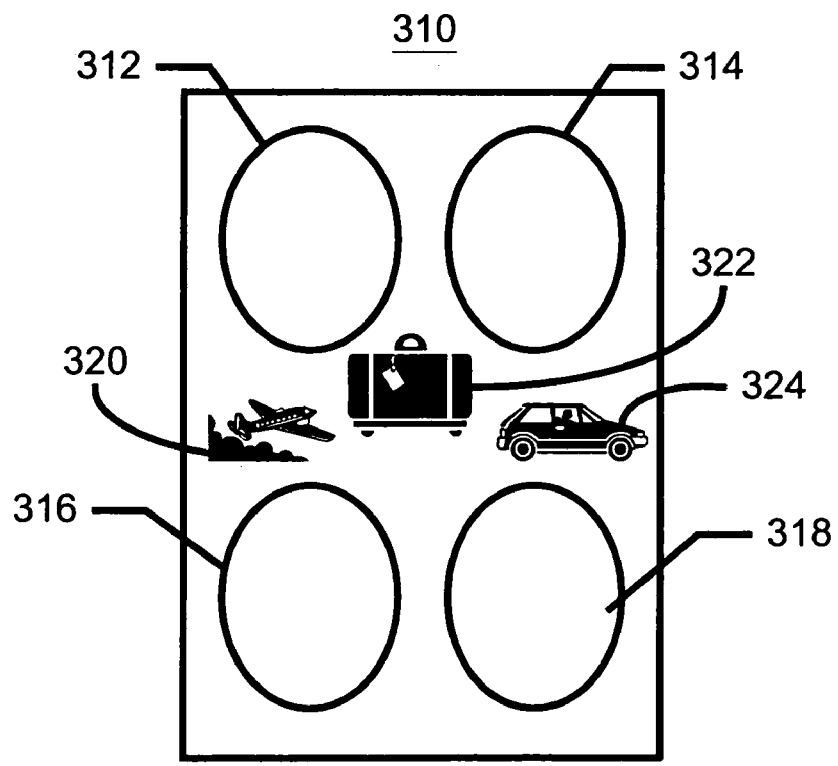
FIG. 6B is a diagram of one embodiment of a background for a page of an album in accordance with the present invention.

FIGS. 6A and 6B depict two embodiments of default layouts which the user may select for the album. FIG. 6A depicts a layout 300 for a page in which a single image is provided per page. The image is to be provided in the space 302. The layout 300 may be selected in a variety of colors. The background for the layout 300 could also include a variety of images or textures. In addition, the layout 300 includes a printed background including items such as the outer border 304 and the inner border 306. FIG. 6B depicts a layout 310. The layout 310 includes oval shaped spaces 312, 314, 316 and 318 for the images. Thus, the default for the layout 310 includes four images. In addition, items 320, 322 and 324 are depicted. In one embodiment, the items 320, 322 and 324 are selected by the user to customize the look of the layout 310, for example for vacation photos. However, in one embodiment other items (not shown) may be selected.

Figure 7:
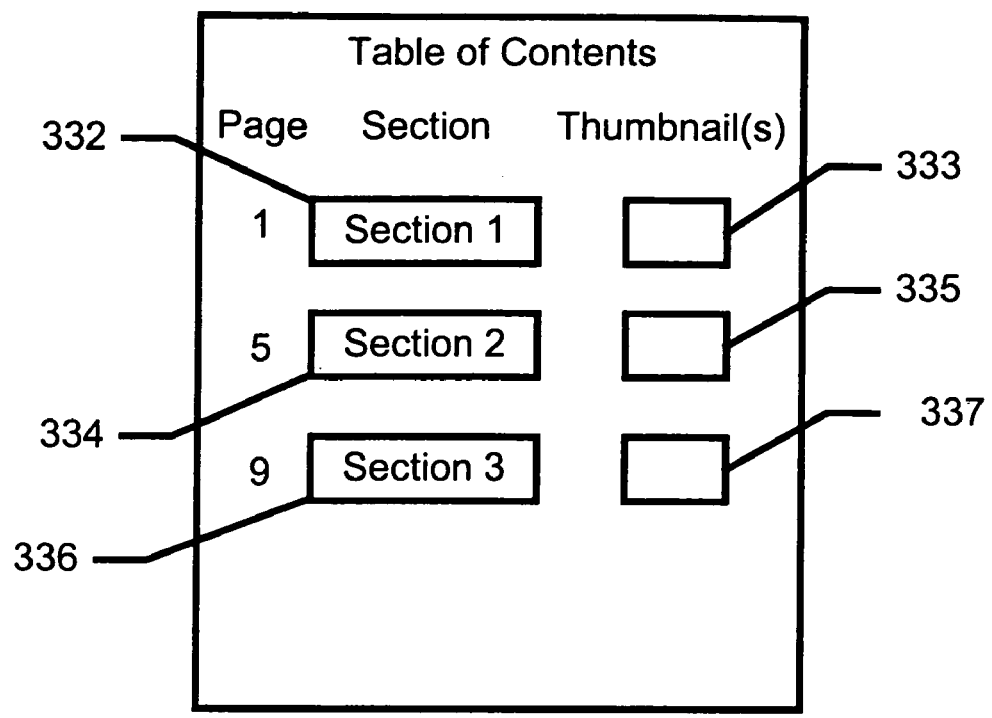
FIG. 7 is a diagram of one embodiment of a table of contents for an album in accordance with the present invention.

FIG. 7 depicts one embodiment of a table of contents 330. The table of contents 330 includes descriptions 332, 334 and 336 for three sections of the corresponding album. In one embodiment, the sections corresponding to the descriptions 332, 334 and 336 may be based on categories for the images, may be based on when the user provided the images or another factor. Also depicted are thumbnails 333, 335 and 337, which display one or more images in the corresponding sections of the album. The table of contents 330 can be provided based on a default set by the user or based on another user request. For a web album, the table of contents 330 could also provide the user with high-level access into sections of the web album. For example, each description 332, 334 and 336 for a section or thumbnails 333, 335 and 337 could link directly to a particular image in the corresponding section of the web album. For example, the thumbnail 333 and/or the description 332 could provide a link to the first image in the corresponding section.

Figure 8:
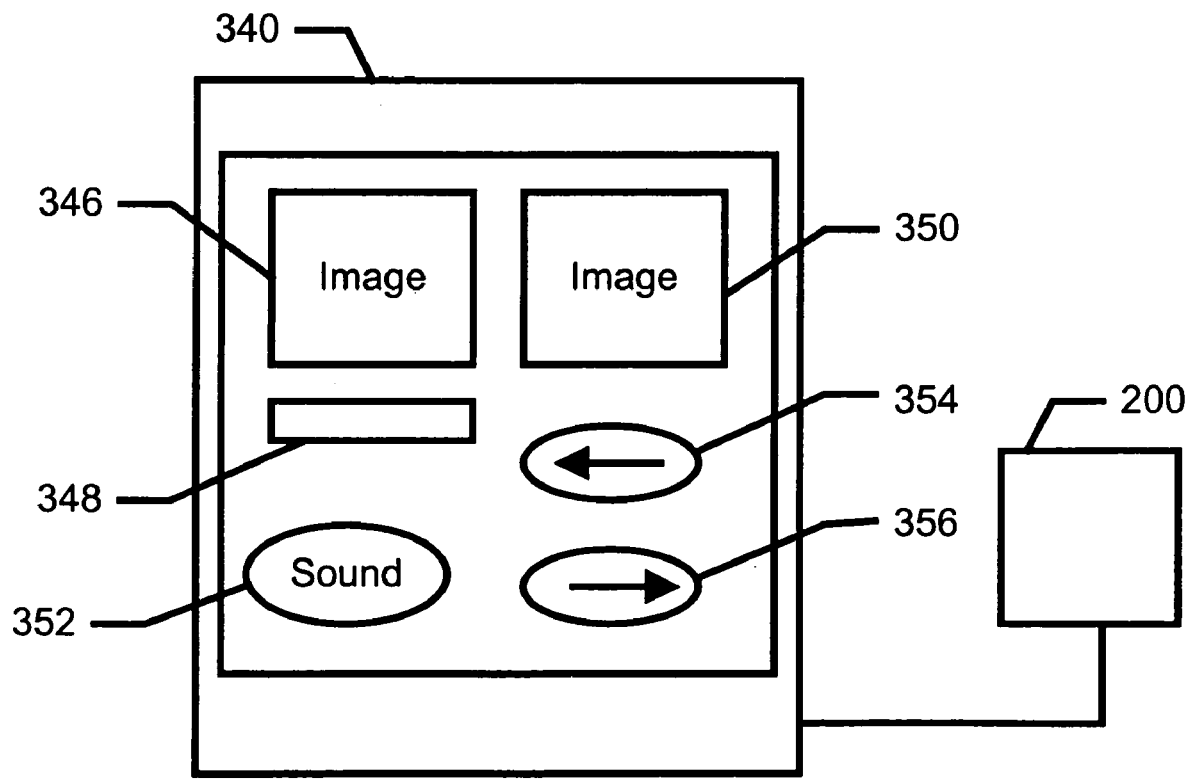
FIG. 8 is a diagram of one embodiment of a system for displaying a page of a web album in accordance with the present invention.

FIG. 8 depicts one embodiment of a portion page 344 of a web album. Depicted in FIG. 8 is a computer 340 having a display 342, which the user can utilize to view the web album. The computer 340 is coupled with the system 200, previously depicted in FIG. 4. Using a website provided by the system 200, the page 344, as well as other pages (not shown) of the web album can be shown to the user. The page 344 includes images 346 and 350. In one embodiment, the default for the web album may be to include two images per page. In another embodiment, the defaults may have been altered to allow two images as shown. Also depicted is a caption 348 corresponding to the image 346. In addition, a button 352 is provided to allow the user to hear sound associated with one or more of the images 346 and 350. Also depicted are a forward button 356 and a back button 354, to allow the user to view other pages of the web album. Furthermore, a table of contents button (not shown) may be provided to allow a user to return directly to the table of contents. Thus, a user is allowed to view the images in different pages of the web album. Furthermore, as discussed above, the pages for the web album, as well as the pages for the printed photo album and CD-ROM, can be customized using defaults and allowing the user to override defaults.

Thus, using the method 100, 120 and 140 and the system 200 the user can rapidly and easily customize an album. Thus, the user can be provided with an album having the desired images, the desired image processing, and the desired look to the album without burdening the user. Instead, the user may be able to prepurchase portions of the album and set the desired look of the album relatively quickly and easily.

A method and system has been disclosed for providing an album to a user. Software written according to the present invention is to be stored in some form of computer-readable medium, such as memory, CD-ROM or transmitted over a network, and executed by a processor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a user with an album including a plurality of pages, the method comprising the steps of:
   (a) allowing a user to purchase at least a portion of the album, the portion of the album including a portion of the plurality of pages;
   (b) allowing the user to set a plurality of defaults for the plurality of pages, at least one default of the plurality of defaults capable of being altered using information provided by the user;
   (c) receiving from the user the information, if any, and a plurality of images captured using a digital imaging device, wherein the information receiving step (c) further includes the step of:
   (c1) receiving a tag stored in at least one image file for a first portion of the plurality of images, the tag for altering the at least one default of the plurality of defaults for the first portion of the plurality of images, wherein the tag received in the image file in step (c1) is received in a communication that is separate from the user setting the plurality of defaults in step (b) and that initially provides the first portion of the plurality of images;
   (d) altering the at least one default if the user has provided the information;
   (e) providing the portion of the plurality of pages using the plurality of defaults; and
   (f) allowing the user access to the at least the portion of the album.

2. The method of claim 1 wherein the purchasing step (a) can occur prior to receiving the plurality of images from the user.

3. The method of claim 1 wherein the purchasing step (a) can occur prior to the plurality of images being captured.

4. The method of claim 1 wherein the receiving step (c) further includes the step of:
   (c2) receiving from the user the information, if any, and the plurality of images directly from the digital imaging device.

5. The method of claim 1 wherein the album is a printed photo album and wherein the access allowing step (f) further includes the step of:
   (f1) providing the portion of the plurality of pages to the user.

6. The method of claim 5 wherein a second portion of the plurality of images include sound and wherein the step of providing the portion of the plurality of pages further includes the steps of:
   (e1) printing the portion of the plurality of pages; and
   (e2) providing a mechanism for a user to hear the sound for the second portion of the plurality of images.

7. The method of claim 6 wherein the mechanism providing step (e2) further includes the step of:
   (e2i) providing a user playable device within a second portion of the portion of the plurality of pages, the second portion of the plurality of pages including the portion of the plurality of images including sound.

8. The method of claim 1 wherein each image of a portion of the plurality of images includes a caption and wherein the providing step (e) further includes the step of:
   (e1) providing the caption for each of the portion of the plurality of images.

9. The method of claim 8 wherein the caption for each of the portion of the plurality of images is a user-recorded caption and wherein caption providing step (e1) further includes the step of:

(e1i) reading the user-recorded caption for each of the portion of the plurality of images;
   (e1ii) converting the user-recorded caption for each of the portion of the plurality of images to a text caption; and
   (e1iii) printing the text caption for each of the portion of the plurality of images.

10. The method of claim 1 wherein the at least one default includes a page layout.

11. The method of claim 1 wherein the at least one default includes a page style.

12. The method of claim 1 wherein each image of a portion of the plurality of images includes a category and wherein the at least one default includes a photo album organization based on the category of each image of the portion of the plurality of image.

13. The method of claim 1 wherein the at least one default includes selecting image analysis for the plurality of images.

14. The method of claim 1 wherein the purchase step (a) further includes the step of:
    (a1) allowing the user to purchase the at least the plurality of pages from a remote location.

15. The method of claim 1 wherein the at least one default selecting step (b) further includes the step of:
    (b2) allowing the user to select the at least one default from a remote location.

16. The method of claim 1 wherein a portion of the plurality of images include sound and wherein the step of providing the portion of the plurality of pages (e) further includes the steps of:
    (e1) archiving the portion of the plurality of pages; and
    (e2) providing a mechanism for a user to hear the sound for the portion of the plurality of images.

17. The method of claim 16 wherein each image of a portion of the plurality of images includes a caption and wherein the archiving step (e1) further includes the step of:
    (e1i) providing the caption for each of the portion of the plurality of images.

18. The method of claim 17 wherein the caption for each of the portion of the plurality of images is a user-recorded caption and wherein caption providing step (e1i) further includes the step of:
    (e1ia) reading the user-recorded caption for each of the portion of the plurality of images;
    (e1ib) converting the user-recorded caption for each of the portion of the plurality of images to a text caption; and
    (e1iic) printing the text caption for each of the portion of the plurality of images.

19. A method for providing a user with an album including a plurality of pages, the album being a printed photo album, the method comprising the steps of:
    (a) allowing a user to purchase at least a portion of the album, the portion of the album including a portion of the plurality of pages;
    (b) allowing the user to set a plurality of defaults for the plurality of pages, at least one default of the plurality of defaults capable of being altered using information provided by the user;
    (c) receiving from the user the information, if any, and a plurality of images captured using a digital imaging device, wherein a portion of the plurality of images include sound, wherein the information receiving step (c) further includes the step of:
    (c1) receiving a tag stored in the at least one image file for a first portion of the plurality of images, the tag for altering the at least one default of the plurality of defaults for the first portion of the plurality of images, the tag received in the image file in step (c1) is received in a communication that is separate from the user setting the plurality of defaults in step (b) and that initially provides the first portion of the plurality of images;

(d) altering the at least one default if the user has provided the information;

(e) providing the portion of the plurality of pages using the plurality of defaults, the portion of the plurality of pages providing step (e) further including the steps of (e1) printing the portion of the plurality of pages; and (e2) providing a mechanism for a user to hear the sound for the portion of the plurality of images wherein the mechanism includes a printed stripe playable by a scanning device and wherein the providing step (e1) further includes the step of:

(e1i) providing the scanning device to the user; and (f) allowing the user access to the at least the portion of the album by providing the portion of the plurality of pages to the user.

20. A system for providing a user with an album including a plurality of pages, the system comprising:

at least one storage subsystem for storing an identity of a user who has purchased at least a portion of the album and a plurality of defaults for the plurality of pages, a portion of the plurality of defaults capable of being set by the user, at least one default of the plurality of defaults capable of being altered using information provided by the user; and a server for receiving a plurality of images captured by a digital camera and provided by the user, the server also for receiving information provided by the user, if any, altering the at least one default if the user has provided the information, the server for providing the portion of the plurality of pages using the plurality of defaults;

wherein the information includes a tag stored in at least one image file for a first portion of the plurality of images, the tag for altering the at least one default for the first portion of the plurality of images; and wherein the server receives the tag stored in the at least one image file from the user in a communication that is separate from receiving the plurality of defaults and that initially provides the first portion of the plurality of images to the server.

21. The system of claim 20 wherein the user can purchase the portion of the plurality of pages prior to the server receiving the plurality of images.

22. The system of claim 20 wherein the user can purchase the portion of the plurality of pages prior to the plurality of images being captured.

23. The system of claim 20 wherein the server receives from the user the information, if any, and the plurality of images directly from the digital imaging device.

24. The system of claim 20 wherein the album is a printed album and wherein the system further includes:

a printing means for printing the portion of the plurality of pages.

25. The system of claim 24 wherein a second portion of the plurality of images include sound and the system further provides a mechanism for a user to hear the sound for the portion of the plurality of images.

26. The system of claim 24 wherein each image of a portion of the plurality of images includes a caption and wherein the printing means further provide the caption for each of the portion of the plurality of images.

27. The system of claim 26 wherein the caption for each of the portion of the plurality of images is a user-recorded caption and wherein server further reads the user-recorded caption for each of the portion of the plurality of images and converts the user-recorded caption for each of the portion of the plurality of images to a text caption.

28. The system of claim 20 wherein the at least one default includes a page layout.

29. The system of claim 20 wherein the at least one default includes a page style.

30. The system of claim 20 wherein each image of a portion of the plurality of images includes a category, and wherein the at least one default includes an album organization based on the category of each image of the portion of the plurality of image and wherein the server further categorizes the portion of the plurality of images.

31. The system of claim 20 wherein the server is further capable of providing image analysis.

32. The system of claim 31 wherein the at least one default includes selecting image analysis for the plurality of images.

33. The system of claim 20 wherein the album is a web album and the system further includes:

a database for archiving the plurality of images in the portion of the plurality of pages.

34. The system of claim 33 wherein a portion of the plurality of images include sound and wherein the server further provides a mechanism for a user to hear the sound for the portion of the plurality of images.

35. The system of claim 34 wherein each image of a portion of the plurality of images includes a caption and wherein the database further archives the caption for each of the portion of the plurality of images.

36. The system of claim 35 wherein the caption for each of the portion of the plurality of images is a user-recorded caption and the server further reads the user-recorded caption for each of the portion of the plurality of images and converts the user-recorded caption for each of the portion of the plurality of images to a text caption.

37. A system for providing a user with an album including a plurality of pages, the album being a printed album, the system comprising:

at least one storage subsystem for storing an identity of a user who has purchased at least a portion of the album and a plurality of defaults for the plurality of pages, a portion of the plurality of defaults capable of being set by the user, at least one default of the plurality of defaults capable of being altered using information provided by the user;

a server for receiving a plurality of images captured by a digital camera and provided by the user, the server also for receiving information provided by the user, if any, altering the at least one default if the user has provided the information, the server for providing the portion of the plurality of pages using the plurality of defaults;

a printing means for printing the portion of the plurality of pages;

wherein the information altering the at least one default is received from the user in an image file a communication that is separate from the plurality of defaults being set and that initially provides the first portion of the plurality of images to the server;

wherein the a portion of the plurality of images include sound and the system further provides a mechanism for a user to hear the sound for the portion of the plurality of images; and wherein the printing means further prints a stripe playable by a scanning device and wherein the scanning device is provided to the user.

38. A method for providing a user with an album including a plurality of pages, the method comprising the steps of:
(a) allowing a user to purchase at least a portion of the album, the portion of the album including a portion of the plurality of pages;
(b) allowing the user to set a plurality of defaults for the plurality of pages in a first session;
(c) receiving from the user the information, if any, and a plurality of images captured using a digital imaging device, wherein the information is capable of altering at least one default of the plurality of defaults for a first portion of the plurality of images, the information and the plurality of images being received from the user in an image file in a second session that is separate from the first session in which the user is allowed to set the plurality of defaults and that initially provides the first portion of the plurality of images;
(d) altering the at least one default if the user has provided the information;
(e) providing the portion of the plurality of pages using the plurality of defaults.

* * * * *

UNITED STATES PATENT AND TRADEMARK OFFICE
CERTIFICATE OF CORRECTION

PATENT NO. : 6,999,637 B1 Page 1 of 1
APPLICATION NO. : 09/526262
DATED : February 14, 2006
INVENTOR(S) : Eric C. Anderson and Stephen D. Saylor It is certified that error appears in the above-identified patent and that said Letters Patent is hereby corrected as shown below:

Column 1, lines 12-13, the phrase, "and assigned to the assignee of the present application" should be deleted.

Column 5, line 55, the phrase, "095/4230" should be amended to read "09/514,230"

Column 5, lines 58-59, the phrase, "and assigned to the assignee of the present application" should be deleted.

Signed and Sealed this

First Day of August, 2006

JON W. DUDAS
*Director of the United States Patent and Trademark Office*